United States Patent [19]

Turner

[11] 4,076,679
[45] Feb. 28, 1978

[54] RAPID SETTING POLYURETHANE ELASTOMERS AND PROCESS OF PREPARATION

[75] Inventor: Robert B. Turner, Lake Jackson, Tex.

[73] Assignee: The Dow Chemical Company, Midland, Mich.

[21] Appl. No.: 761,190

[22] Filed: Jan. 21, 1977

Related U.S. Application Data

[63] Continuation-in-part of Ser. No. 651,327, Jan. 21, 1976, abandoned, which is a continuation-in-part of Ser. No. 545,691, Jan. 30, 1975, abandoned.

[51] Int. Cl.² .................. C08K 5/11; C08K 5/01; C08G 18/04
[52] U.S. Cl. .................. 260/31.2 N; 260/33.6 UB; 260/77.5 R; 260/77.5 CR
[58] Field of Search .................. 260/33.6 UB, 77.5 R, 260/77.5 CR, 31.2 N

[56] References Cited

U.S. PATENT DOCUMENTS

| | | | |
|---|---|---|---|
| 2,833,740 | 5/1958 | Verbanc | 260/45.5 |
| 3,028,367 | 4/1962 | O'Brien | 260/77.5 |
| 3,049,505 | 8/1962 | Grabowski | 260/45.4 |
| 3,159,608 | 12/1964 | Ilnyckyj | 260/87.3 |
| 3,254,063 | 5/1966 | Ilnyckyj | 260/87.3 |
| 3,351,676 | 11/1967 | Saunders et al. | 260/859 |
| 3,357,939 | 12/1967 | Reischl et al. | 260/30.6 |
| 3,358,052 | 12/1967 | Archer et al. | 260/859 |
| 3,447,915 | 6/1969 | Otto | 44/62 |
| 3,532,652 | 10/1970 | Zang et al. | 260/23 |
| 3,627,838 | 12/1971 | Ilnyckyj et al. | 260/87.3 |
| 3,638,349 | 2/1972 | Wisotski et al. | 44/62 |
| 3,751,520 | 8/1973 | Yasuda | 260/859 R |
| 3,776,877 | 12/1973 | Kelley et al. | 260/31.8 M |
| 3,801,532 | 4/1974 | Olstowski | 260/33.8 UB |
| 3,838,110 | 9/1974 | Villa | 260/77.5 CR |
| 3,878,157 | 4/1975 | Olstowski et al. | 260/33.8 UB |

OTHER PUBLICATIONS

Conversions, The Upjohn Company, LaPorte, Texas.
Small– "Some Factors Affecting the Solubility of Polymers", J. Appl. Chem. vol. 3, Feb. 1953, pp. 71–80.

*Primary Examiner*—H.S. Cockeram
*Attorney, Agent, or Firm*—James G. Carter

[57] ABSTRACT

Rapid setting polyurethanes are prepared from polyols having a functionality of from 2 to 8, a polyisocyanate, a non-amine containing catalyst and as a modifier, a polymer of an ethylencilly unsaturated monomer said polymer having the following characteristics:
  (1) a molecular weight such that the polymer has a grease melt flow index as determined with a 0.02 inch orifice employing a total weight of 2160 grams at 80° C of from about 1 to about 250 decigrams/-minute;
  (2) a solubility parameter at 25° C of at least about 8;
  (3) and a specific heat of at least 0.35 cal/g/° C.

20 Claims, No Drawings

RAPID SETTING POLYURETHANE ELASTOMERS AND PROCESS OF PREPARATION

This application is a continuation-in-part of application Ser. No. 651,327, filed Jan. 21, 1976, and now abandoned, which is a continuation-in-part of application Ser. No. 545,691, filed Jan. 30, 1975 now abandoned.

The present invention relates to rapid-setting polyurethanes and process for their preparation.

Rapid-setting polyurethanes are known in the art such as described in U.S. Pat. Nos. 3,378,511; 3,726,827; 3,746,692; 3,801,532; U.S. patent application Ser. No. 366,835, filed June 4, 1973, allowed Sept. 28, 1973, now U.S. Pat. No. 3,878,157.

The prior art has employed as the modifier component in rapid-setting polyurethanes liquids having boiling points above about 150° C and in certain circumstances, liquids boiling below about 150° C and solid substances having a particle size of less than about ¼ inch in its minimum dimension, i.e., the particle or fiber will pass through a ¼ inch square opening, and a surface area of less than about 0.2 m²/g. Such solid substances have included organic polymers of polymerizable ethylenically unsaturated monomers.

It has now been unexpectedly discovered that certain low molecular weight polymers of ethylenically unsaturated monomers in the form of a liquid or grease and which have a grease melt flow index of from about 1 to about 250 decigrams/minute can be employed as the modifier component in rapid-setting polyurethanes.

The modifiers of the present invention possess improvements over some of the known modifiers, e.g., esters of carboxylic acids such as dioctylphthalate in that smaller quantities of the modifier of the present invention can be employed to produce articles of greater thickness without cracking.

The present invention is directed to solid, non-cellular, i.e., non-foamed, non-elastomeric, rapid-setting polyurethanes having a density of at least about 1 g/cc, a percent elongation of less than about 100, a heat distortion temperature of at least about 180° F (82° C) and which can be demolded within a period of about 5 minutes without the addition of an external source of heat which polyurethane results from the admixture of a composition which comprises:

(A) a polyhydroxyl-containing material having from about 2 to about 8 hydroxyl groups and an average OH equivalent weight of not greater than about 250;

(B) an organic polyisocyanate;

(C) as a modifier, from about 1% to about 20%, preferably from about 5% to about 18% and most preferably from about 9% to about 15% by weight based upon the combined weight of Components (A), (B) and (C) of a polymer or one or more ethylenically unsaturated monomers said polymer having the following characteristics:

(1) a molecular weight such that the polymer has a grease melt flow index as determined with a 0.02 inch orifice employing a total weight of 2160 grams at 80° C of from about 1 to about 250 decigrams/minute, preferably from about 75 to about 200 decigrams/minute;

(2) a solubility parameter at 25° C of at least about 8 and preferably from about 8 to about 12.5 (the units being understood throughout to be cal$^{\frac{1}{2}}$ per cc$^{\frac{1}{2}}$);

(3) and a specific heat of at least about 0.35 calories/gram/° C; and (D) a non-amine containing catalyst for urethane formation;

wherein components (A) and (B) are present in quantities so as to provide an NCO:OH ratio of from about 0.8:1 to about 1.5:1 and preferably from about 0.9:1 to about 1.2:1 and with the proviso that when Component (A) has an average functionality of substantially less than about 3, then the average functionality of Component (B) is at least about 2.5.

The process of the present invention for preparing polyurethanes having a density of at least about 1 g/cc a percent elongation of less than about 100, a heat distortion temperature of at least about 180° F (82° C) which can be demolded within a period of about 5 minutes without the application of an external source of heat comprises:

(1) admixing the components of a composition comprising:

(A) a polyhydroxyl-containing material having from about 2 to about 8 hydroxyl groups and an average OH equivalent weight of not greater than about 250;

(B) an organic polyisocyanate;

(C) as a modifier, from about 1% to about 20%, preferably from about 5% to about 18% and most preferably from about 9% to about 15% by weight based upon the combined weight of Components (A), (B) and (C) of a polymer of one or more ethylenically unsaturated monomers said polymer having the following characteristics:

(a) a molecular weight such that the polymer has a grease melt flow index as determined with a 0.02 inch orifice employing a total weight of 2160 grams at 80° C of from about 1 to about 250 decigrams/minute, preferably from about 75 to about 200 decigrams/minute;

(b) a solubility parameter at 25° C of at least 8 and preferably from 8 up to about 12.5;

(c) and a specific heat of at least about 0.35 calories/gram/° C; and (D) a non-amine containing catalyst for urethane formation;

wherein Components (A) and (B) are present in quantities so as to provide an NCO:OH ratio of from about 0.8:1 to about 1.5:1 and preferably from about 0.9:1 to about 1.2:1 and with the proviso that when Component (A) has an average functionality of substantially less than about 3, then the average functionality of Component (B) is at least about 2.5;

(2) placing the admixed composition into a suitable mold wherein said composition solidifies within less than about 5 minutes to a solid having the aforesaid density, percent elongation and heat distortion temperature; and (3) subsequently demolding the resultant article from the mold.

The grease melt flow index as stated above is a modification of ASTM D-1238.

Specific heat values of the polymers can readily be determined by thermogravimetric analysis.

The solubility parameters of the polymers can be determined by the equation $$\delta = \sqrt{\frac{\Delta H_v - RT}{V_m}}$$

where
δ is the solubility parameter,
$\Delta H_v$ is the latent heat of vaporization expressed as calories per mole,
R is the gas constant $$(1.987 \cdot \frac{\text{calories}}{^\circ K \times \text{mole}}),$$

T is the temperature in ° K and
$V_m$ is the molar volume in cubic centimeters.

The solubility parameters of various polymers is discussed by P. A. Small in "SOME FACTORS AFFECTING THE SOLUBILITY OF POLYMERS", J. Appl. Chem., Vol. 3, Feb. 1953, pp. 71–80.

The term rapid-setting as used herein means that the composition will rapidly solidify without the application of external sources of heat and can be removed from a mold within 5 minutes and preferably within 3 minutes from the time the reactants are mixed together. Upon removal from the mold and after cooling, the products have sufficient strength to be handled and normally have sufficient strength to be employed for their intended purpose. However, if desired, the resultant articles can be post cured at elevated temperatures.

Suitable initiator compounds having from 3 to 8 hydroxyl groups which can be employed to prepare polyols suitable for use as Component A in the present invention include, for example, glycerine, trimethylolpropane, pentaerythritol, sorbitol, sucrose, mixtures thereof and the like.

Suitable vicinal epoxy compounds which can be reacted with the initiator compounds to prepare the polyols employed as Component (A) in the present invention include, for example, the lower alkylene oxides and substituted alkylene oxides as ethylene oxide, 1,2-propylene oxide, 1,2-butylene oxide, 2,3-butylene oxide, epichlorohydrin, epibromohydrin, epiodohydrin, styrene oxide, mixtures thereof and the like.

Suitable dihydroxyl-containing compounds having an OH equivalent weight below about 250 which can be employed as Component (A) include, for example, ethylene glycol, propylene glycol, butylene glycol, pentanediol, hexanediol, diethylene glycol, dipropylene glycol, bisphenol A, resorcinol, catechol, hydroquinone, mixtures thereof, adducts of a dihydroxyl-containing compound and a vicinal epoxy compound such as, for example, ethylene oxide, 1,2-propylene oxide, 1,2-butylene oxide, epichlorohydrin, epibromohydrin, butyl glycidyl ether, phenyl glycidyl ether, mixtures thereof and the like. When the dihydroxyl containing compound is a solid it is suitably employed by dissolving it in a suitable solvent such as, for example, tri-n-butyl phosphate, triethyl phosphate and the like.

Suitable organic polyisocyanates which are employed as Component (B) in the present invention include, for example, any organic polyisocyanate having 2 or more NCO groups per molecule and no other substituents capable of reacting with the hydroxyl groups of the compounds employed as Component (A). Suitable such polyisocyanates include, for example, 2,4-toluene diisocyanate, 2,6-toluene diisocyanate, hexamethylene diisocyanate, p,p'-diphenylmethane diisocyanate, p-phenylene diisocyanate, hydrogenated methylene diphenyl diisocyanate (e.g., Hylene[R] W), nephthalene diisocyanate, dianisidine diisocyanate, polymethylene polyphenylisocyanate, mixtures of one or more polyisocyanates and the like.

Other organic polyisocyanates which are suitably employed and which are to be included in the term organic polyisocyanate include isocyanate terminated prepolymers prepared from the previously mentioned polyols and the above mentioned isocyanates.

Suitable polyisocyanates which can be employed as Component (B) in the polyurethane compositions of the present invention also include those having an average NCO functionality of at least about 2.5 such as, for example, the polymethylene polyphenyl isocyanates, NCO-containing prepolymers such as the reaction products of an excess of an organic diisocyanate with polyhydroxyl containing compounds having from 3 to about 8 OH groups per molecule such as, for example, glycerine, trimethylolpropane, pentaerythritol, sorbitol, sucrose, mixtures thereof and mixtures with dihydroxyl-containing compounds such that the average hydroxyl functionality of the mixture is at least about 2.5. It is preferred that the organic polyisocyanate be liquid. However, in the event that it is a solid or semisolid or of a relatively high viscosity such that blending with the other components would be difficult or inconvenient, they may be prepared in a suitable solvent selected from those compositions which are employed as Component (D) herein and any quantity of such Component (D) employed as a solvent for the polyisocyanate is included as a portion of the total quantity of Component (D) employed in the rapid-setting composition. Suitable such solvents include, for example, trichlorobenzene, propylene carbonate and the like.

Suitable organic diisocyanates which are employed in the preparation of the prepolymers containing an average of at least 2.5 NCO groups include for example, 2,4-toluene diisocyanate, 2,6-toluene diisocyanate, hexamethylene diisocyanate, p,p'-diphenylmethane diisocyanate, p-phenylene diisocyanate, hydrogenated methylene diphenyl diisocyanate (e.g., Hylene[R] W), naphthalene diisocyanate, dianisidine diisocyanate, mixtures of one or more polyisocyanates and the like.

The prepolymers employed as the polyisocyanate, Component (B), in the present invention have a percent free NCO content of from about 8 to about 40 and preferably from about 12 to about 32 percent by weight.

Polymers which can be employed herein as the modifier component in the present invention include, for example, polymers prepared from such ethylenically unsaturated monomers as, vinyl acetate, isobutylacrylate, ethylene, alpha-methyl styrene, propylene, ethyl acrylate, methyl methacrylate, styrene, acrylic acid, n-butyl acrylate, 1-butene, 2-ethylhexyl acrylate, β-hydroxyethyl acrylate, stearyl acrylate, maleic anhydride, itaconic acid, methyl acid maleate, β-hydroxypropyl acrylate, vinylidene chloride, glycidyl methacrylate, lauryl methacrylate, cyclohexyl acrylate, 2-methoxy propene, tertiary butyl styrene, vinyl toluene, divinyl benzene, acrylamide, acrylonitrile, methacrylonitrile, mixtures thereof and the like.

Suitable non-amine-containing catalysts for urethane formation include, for example, organo-metal compounds of tin, zinc, lead, mercury, cadmium, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalyst be employed in liquid form. Those catalysts which are not ordinarily liquids may be added as a solution in a solvent which is compatible with the other components employed in the composition of the present invention. Suitable such solvents include, for example, dioctaylphthalate, polyoxyalkylene glycols, mineral spirits, dipropylene glycol, mixtures thereof and the like.

Suitable materials from which adequate molds, for casting the compositions of the present invention, may be prepared include polymers such as, for example, polyethylene, polypropylene, their copolymers and the like, polyurethanes, polysiloxane elastomers, Mylar$^R$, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e., the reactants may not be readily demolded unless the mold is preheated to about 50°-100° C, especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, game pieces, decorative objects, furniture or furniture components, electrical insulators, electrical wire hanger supports, gears or other machine components, threaded protective plugs and caps, and the like.

In the following examples and comparative experiments, all of the components were thoroughly blended and poured into a ⅛ inch × 11 inch × 11 inch aluminum mold. After removing from the mold, the resultant polyurethanes were heated at a temperature of 60° C for 4 hours before determining the physical properties unless otherwise indicated.

In each of the examples and comparative experiments, the following components were employed.

Polyol A was an adduct of glycerine and propylene oxide to an OH equivalent weight of about 85.

Polyisocyanate A was an adduct of an excess of 80/20 2,4-/2,6-toluene diisocyanate and Polyol A, the resultant prepolymer having a percent free NCO of about 29.6% and an NCO equivalent weight of about 141.

Polymer Modifier A was an ethylene-vinyl acetate copolymer containing about 38.4% vinyl acetate and having a solubility parameter ($\delta$) at 25° C of about 8.5, a specific heat of 0.5 cal/g/° C and a grease melt flow index of 11.6 decigrams/min.

Polymer Modifier B was an ethylene-n-butyl acrylate copolymer containing about 44.6% n-butyl acrylate and having a solubility parameter ($\delta$) at 25° C of about 8.6, a specific heat value of about 0.47 cal/g/° C and a grease melt flow index of about 14.5 decigrams/min.

Polymer Modifier C was an ethylene-vinyl acetate copolymer containing about 44% vinyl acetate and having a solubility parameter ($\delta$) at 25° C of about 8.5, a specific heat value of about 0.44 cal/g/° C, and a grease melt flow index of about 13.1 decigrams/min.

Polymer Modifier D was an ethylene-vinyl acetate copolymer containing about 33.2% vinyl acetate and having a solubility parameter ($\delta$) at 25° C of about 8.5, a specific heat value of about 0.47 cal/g/° C and a grease melt flow index of about 9.4 decigrams/min.

Polymer Modifier E was an alpha-methylstyrene polymer having a solubility parameter ($\delta$) at 25° C of about 9.2, a specific heat value of about 0.35 cal/g/° C and a grease melt flow index of about 200 decigrams/min. (commercially available as Dow Resin 276-V2 from The Dow Chemical Company).

Polymer Modifier F was a trichloroethylene-vinyl acetate copolymer prepared by heating 4000 grams of trichloroethylene and 327.5 grams of vinyl acetate in the presence of 107.15 grams of benzoyl peroxide at about 70° C for about 10.5 hours. The polymer had a solubility parameter ($\delta$) at 25° C of 9.7, a specific heat value of 0.29 cal/g/° C and a grease melt flow index of 115 decigrams/min.

Polymer Modifier G was a polyethylene grease having a solubility parameter ($\delta$) at 25° C of 7.2-7.5, a specific heat value of 0.55 cal/g/° C and a grease melt flow index of 20.1 decigrams/min.

Polymer Modifier H was a copolymer of ethylene and vinyl acetate containing 53.3% vinyl acetate. The polymer had a solubility parameter ($\delta$) at 25° C of 8.5, a specific heat value of 0.48 cal/g/° C and a grease melt flow index of 17.7 decigrams/min.

Polymer Modifier I was a copolymer of ethylene and vinyl acetate containing 35.8% vinyl acetate. The polymer had a solubility parameter ($\delta$) at 25° C of 8.5, a specific heat value of 0.46 cal/g/° C and a grease melt flow index of 108 decigrams/min.

Polymer Modifier J was a copolymer of ethylene and n-butyl acrylate containing 48.9% n-butyl acrylate. The polymer had a solubility parameter ($\delta$) at 25° C of 8.4, a specific heat value of 0.49 cal/g/° C and a grease melt flow index of 10.7 decigrams/min.

Polymer Modifier K was a copolymer of ethylene and n-butyl acrylate containing 47.5% n-butyl acrylate. The polymer had a solubility parameter ($\delta$) at 25° C of 8.5, a specific heat value of 0.47 and a grease melt index of 16 decigrams/min.

Polymer Modifier L was a copolymer of ethylene and vinyl acetate containing 55.5% vinyl acetate. The polymer had a solubility parameter ($\delta$) at 25° C of 8.5, a specific heat value of 0.45 cal/g/° C and a grease melt flow index of 28 decigrams/min.

GENERAL PROCEDURE FOR THE PREPARATION OF THE POLYMER MODIFIERS

The polymer modifiers were prepared in a continuous stirred autoclave at high pressures employing the following procedure. Ethylene mixed with a telogen (chain transfer agent) was compressed to the desired reaction pressure and fed into the reactor entry near the top of the reaction zone. The comonomer was then pressured into the line carrying the ethylene-telogen mixture at a point near the reactor entry. At a second reactor entry diametrically opposed to the ethylene mixture entry a solution of the initiator (di-tertiary butyl peroxide or tertiary butyl peracetate) was added at a rate sufficient to maintain the desired reactor temperature. The reaction mixture was continuously removed through a valve at the bottom of the reactor at a rate which maintained the desired reaction pressure. The reactor effluent was then flashed into a vessel (high pressure separator) maintained at about 1800 psig in which about 95% of the unreacted ethylene, telogen and comonomer were evaporated, removed through an outlet at the top of the vessel and recompressed to be returned to the reactor together with make-up ethylene, telogen and comonomer. The copolymer product was then removed from the vessel and flashed a second time in a second vessel (low pressure separator) maintained at about 4 psig. The flashed ethylene, telogen and comonomer were returned to the reactor. The copolymer was then removed from the vessel and stored.

The reaction temperature and pressure composition of feed stream, initiator, telogen and % comonomer in product is given in the following Table I.

COMPARATIVE EXPERIMENT C

An article measuring 3½ inches × 3½ inches × 9½ inches was prepared from a composition similar to that of Example 2 and difference being that 22 parts of dioctyl phthalate was employed as the modifier instead of Modifier A. The resultant article split and cracked.

I claim:

1. Non-cellular, non-elastomeric polyurethanes having a density of at least about 1 g/cc, a percent elongation of less than about 100, a heat distortion temperature of at least about 180° F (82° C) and which can be demolded within a period of about 5 minutes without the addition of an external source of heat which polyurethane results from the admixture and reaction of a composition which comprises:

(A) a polyhydroxyl-containing material having from about 2 to about 8 hydroxyl groups and an average OH equivalent weight of not greater than about 250;

(B) an organic polyisocyanate;

(C) as a modifier, from about 1% to about 20%

TABLE I

| Polymer Modifier | REACTOR FEED COMPOSITION | | | REACT. CONDITIONS | | | Grease Melt Indx. decigrams | % Comonomer in Product |
|---|---|---|---|---|---|---|---|---|
| | Ethylene Wt. % | Comonomer Wt. % | Telogen Wt. % | Temp. °C | Press. psig | Initiator | | |
| A | 59 | vinyl acetate/30 | isobutane/11 | 232 | 17,500 | t-butyl peracetate | 11.6 | 38.4 |
| B | 82.6 | n-butyl acrylate/10.4 | propylene/7 | 272 | 17,900 | di-t-butyl peroxide | 14.5 | 44.6 |
| C | 53.6 | vinyl acetate/33.4 | isobutane/13 | 231–234 | 17,400 | t-butyl peracetate | 13.1 | 44 |
| D | 64.3 | vinyl acetate/25.7 | isobutane/10 | 232–234 | 17,600 | t-butyl peracetate | 9.4 | 33.2 |
| H | 16.5 | vinyl acetate/47.4 | propane/36.1 | 243 | 12,000 | t-butyl peracetate | 17.7 | 53.3 |
| I | 42.9 | vinyl acetate/42.9 | isobutane/14.2 | 242 | 12,000 | t-butyl peracetate | 108 | 35.8 |
| J | 80.3 | n-butyl acrylate/18.1 | propylene/1.6 | 277 | 20,000 | di-t-butyl peroxide | 10.7 | 48.9 |
| K | 78.4 | n-butyl acrylate/10.8 | hexane/10.8 | 262 | 18,000 | di-t-butyl peroxide | 16 | 47.5 |
| L | 14.3 | vinyl acetate/49.6 | propane/36.1 | 241 | 12,000 | t-butyl peracetate | 28 | 55.5 |

In each example and comparative experiments, the following formulation was employed:
84 parts by weight of Polyol A
141 parts by weight of Prepolymer A
Indicated parts by weight of Indicated Modifier
0.84 parts by weight of a commercial stannous octoate catalyst (T-9 from M&T Chemicals).
The results are given in the following Table II.

TABLE II

| Example of Comparative Experiment | Modifier/pbw* | Solidification Time/min. | Demold Time min. | Tensile psi | Elongation % | Izod Impact ft lb/in of notch | Density g/cc | Hardness Shore D | Heat Distortion Temp, °F |
|---|---|---|---|---|---|---|---|---|---|
| Example 1 | C/22 | <1 | <2 | 12,000 | 20 | 0.9 | 1.16 | 76 | 185 |
| Example 2 | A/22 | <1 | <2 | 14,500 | 14 | 0.81 | 1.208 | 84 | 203 |
| Example 3 | A/22 | <1 | <2 | 14,500** | 14** | 0.81** | 1.208** | 84** | 203** |
| Example 4 | D/22 | <1 | <2 | 14,900 | 14 | 0.81 | 1.210 | 83 | 206 |
| Example 5 | B/22 | <1 | <2 | 14,700 | 16 | 0.90 | 1.205 | 83 | 212 |
| Example 6 | A/3 | <1 | <2 | 16,200 | 12 | 1.2 | 1.235 | 86 | 189 |
| Example 7 | A/40 | <1 | <2 | 9,500 | 13 | 0.7 | 1.187 | 80 | 206 |
| Example 8 | E/22 | <1 | <2 | 11,300 | 13 | 1.03 | 1.179 | 76 | 191 |
| Comp. Expt. A | F/22 | The mixture began to decompose within about 30 seconds into a brown smoke producing foamy mass. | | | | | | | |
| Comp. Expt. B | G/22 | After about 1 hour, the mixture was still a stick gooey mass. | | | | | | | |
| Example 9 | H/32 | <1 | <1 | 9,675 | 9 | 0.98 | 1.198 | 75 | 192 |
| Example 10 | I/32 | <1 | <2 | 9,700 | 9 | 0.69 | 1.184 | 80 | 199 |
| Example 11 | J/32 | <1 | <2 | 9,400 | 10 | 0.98 | 1.184 | 79 | 192 |
| Example 12 | K/32 | <1 | <2 | 9,675 | 10 | 0.85 | 1.185 | 78 | 207 |
| Example 13 | L/32 | <1 | <2 | 10,000 | 12 | 0.99 | 1.187 | 80 | 210 |

*parts by weight
**Properties determined without preheating at 60° C for 4 hours

EXAMPLE 9

An article measuring 3½ inches × 3½ inches × 9½ inches was prepared from the composition of Example 2 exhibited no evidence of cracking or splitting.

weight based upon the combined weight of Components (A), (B) and (C) of a polymer of one or more ethylenically unsaturated monomers said polymer having the following characteristics:

(1) a molecular weight such that the polymer has a grease melt flow index as determined with a 0.02 inch orifice employing a total weight of 2160 grams at 80° C of from about 1 to about 250 decigrams/minute;

(2) a solubility parameter at 25° C of at least about 8;

(3) and a specific heat of at least about 0.35 cal/g/° C and (D) a non-amine containing catalyst for urethane formation; wherein Components (A) and (B) are present in quantities so as to provide an NCO:OH ratio of from about 0.8:1 to about 1.5:1 and with the proviso that when Component (A) has an average functionality of substantially less than about 3, then the average functionality of Component (B) is at least about 2.5.

2. A polyurethane of claim 1 where Component (C) has a grease melt flow index of from about 75 to about 200 and is present in quantities of from about 5% to about 18% by weight and wherein the NCO:OH ratio is from about 0.9:1 to about 1.2:1.

3. A polyurethane of claim 2 wherein Component (C) is present in quantities of from about 9% to about 15% by weight.

4. A polyurethane of claim 3 wherein Component (C) is a copolymer of ethylene and an ester of a carboxylic acid and has a solubility parameter at 25° C of from about 8 to about 12.5.

5. A polyurethane of claim 4 wherein said ester of a carboxylic acid is vinyl acetate or isobutyl acrylate.

6. A polyurethane of claim 3 wherein Component (C) is a polymer of alpha-methylstyrene.

7. A polyurethane of claim 4 wherein Component (A) is an adduct of glycerine and propylene oxide.

8. The composition of claim 1 cast as a furniture component.

9. The composition of claim 1 cast as a decorative object.

10. The composition of claim 1 cast as a machine component.

11. A process for preparing polyurethanes having a density of at least about 1 g/cc, a percent elongation of less than about 100, a heat distortion temperature of at least about 180° F (82° C) and which can be demolded within a period of about 5 minutes without the application of an external source of heat which process comprises:

(1) admixing the components of a composition comprising:

(A) a polyhydroxyl-containing material having from about 2 to about 8 hydroxyl groups and an average OH equivalent weight of not greater than about 250;

(B) an organic polyisocyanate;

(C) as a modifier, from about 1% to about 20%, by weight based upon the combined weight of Components (A), (B) and (C) of a polymer of one or more ethylenically unsaturated monomers having the following characteristics:

(a) a molecular weight such that the polymer has a grease melt flow index as determined with a 0.02 inch orifice employing a total weight of 2160 grams at 80° C of from about 1 to about 250 decigrams/minute;

(b) a solubility parameter at 25° C of at least about 8;

(c) and a specific heat of at least about 0.35 cal/g/° C; and (D) a non-amine containing catalyst for urethane formation;

wherein Components (A) and (B) are present in quantities so as to provide an NCO:OH ratio of from about 0.8:1 to about 1.5:1 and with the proviso that when Component (A) has an average functionality of substantially less than about 3, then the average functionality of Component (B) is at least about 2.5;

(2) placing the admixed composition into a suitable mold wherein said composition solidifies within less than about 5 minutes to a solid having the aforesaid density, percent elongation and heat distortion temperature; and (3) subsequently demolding the resultant article from the mold.

12. The process of claim 11 wherein Component (C) has a grease melt flow index of from about 75 to about 200 and is present in quantities of from about 5% to about 18% by weight and wherein the NCO:OH ratio is from about 0.9:1 to about 1.2:1.

13. The process of claim 12 wherein Component (C) is present in quantities of from about 9% to about 15% by weight.

14. Th process of claim 13 wherein Component (C) is a copolymer of ethylene and an ester of a carboxylic acid and has a solubility parameter of from about 8 to about 12.5.

15. The process of claim 14 wherein said ester is vinyl acetate or isobutyl acrylate.

16. The process of claim 13 wherein Component (C) is a polymer of alpha-methylstyrene.

17. The process of claim 14 wherein Component (A) is an adduct of glycerine and propylene oxide.

18. The process of claim 11 wherein said mold is in the form of a furniture component.

19. The process of claim 11 wherein said mold is in the form of a decorative object.

20. The process of claim 11 wherein said mold is in the form of a machine component.

* * * * *